M. M. TURNER.
FRUIT PRESS.
APPLICATION FILED JULY 26, 1915.

1,180,959.

Patented Apr. 25, 1916.
2 SHEETS—SHEET 1.

WITNESSES:
Charles Pickles
Thos Castberg

INVENTOR
Madeline M. Turner
BY Strong & Townsend
ATTORNEYS

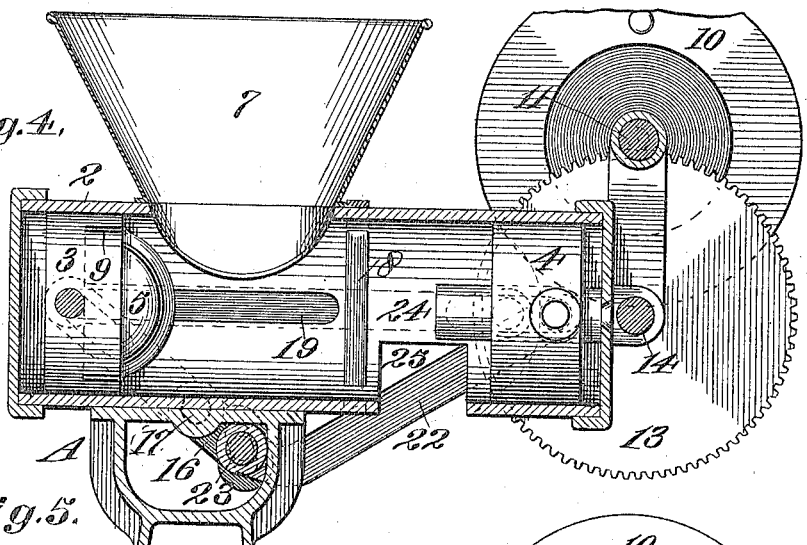
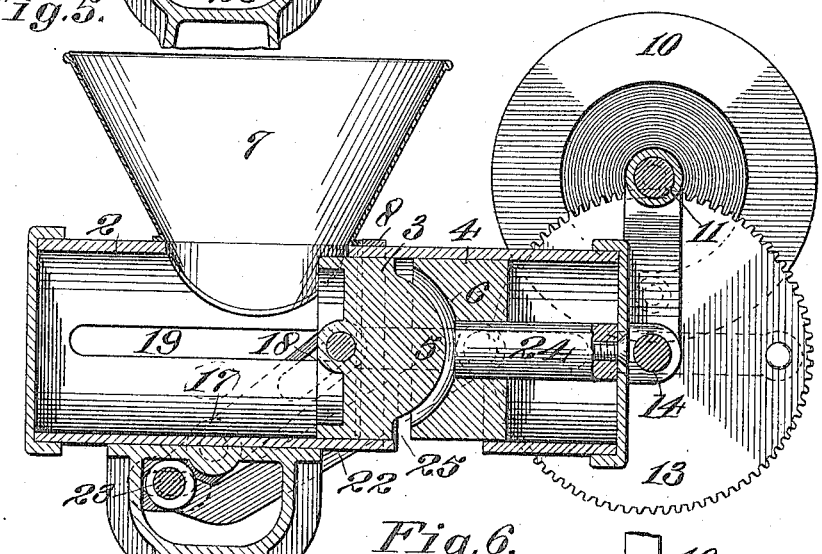
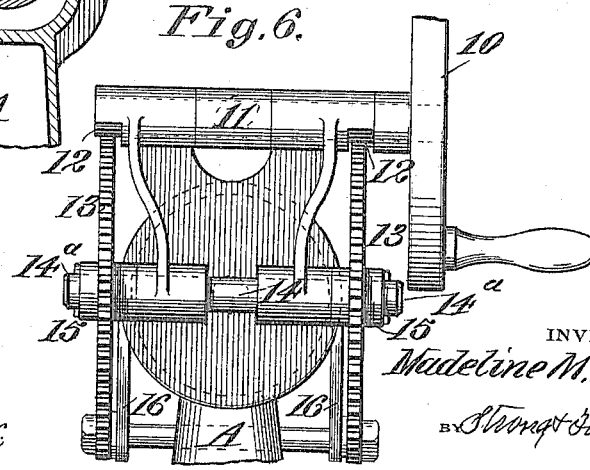

UNITED STATES PATENT OFFICE.

MADELINE M. TURNER, OF OAKLAND, CALIFORNIA.

FRUIT-PRESS.

1,180,959.　　　　　Specification of Letters Patent.　　Patented Apr. 25, 1916.

Application filed July 26, 1915.　Serial No. 41,905.

*To all whom it may concern:*

Be it known that I, MADELINE M. TURNER, a citizen of the United States, residing at Oakland, in the county of Alameda and State of California, have invented new and useful Improvements in Fruit-Presses, of which the following is a specification.

My invention relates to improvements in presses of that class which is designed to extract the juice from fruits, such as lemons, oranges, and like fruits.

It consists of a pair of horizontally movable presser plates having respectively concave and convex faces, means by which said plates are reciprocated, one at a higher speed and greater movement than the other, means by which the fruit is fed singly between the plates, a cutter by which the fruit is severed, a stationary stop extending through the center of one of the plungers and having its face coinciding with that of the said plunger when the latter has reached the limit of its forward movement, and means by which the differential movement of the plungers is effected.

It also comprises details of construction which will be more fully explained by reference to the accompanying drawings, in which—

Figure 1:
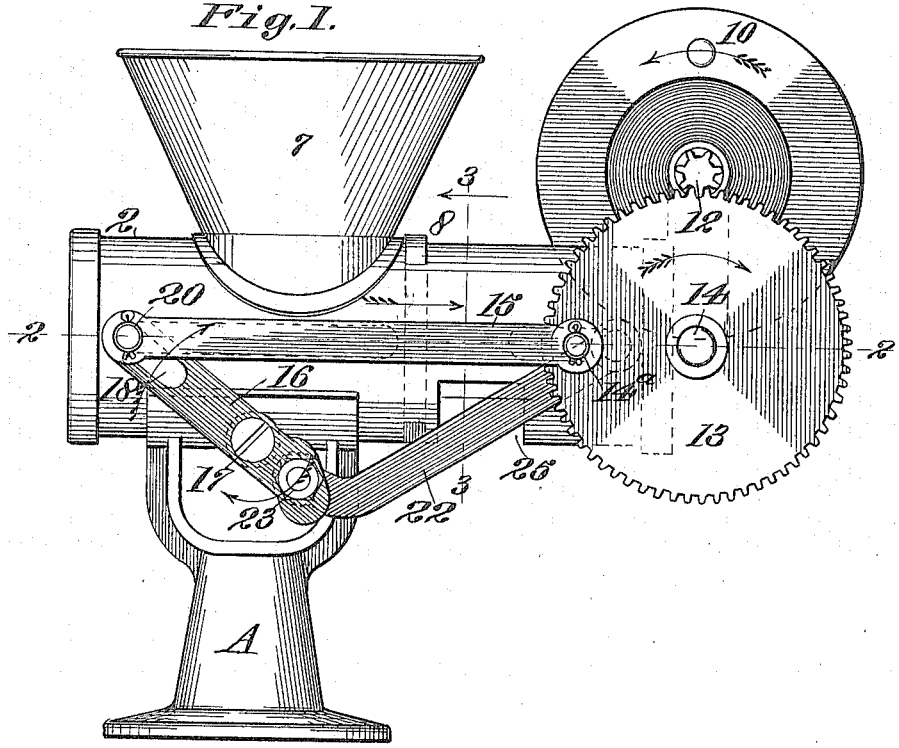
Figure 2:
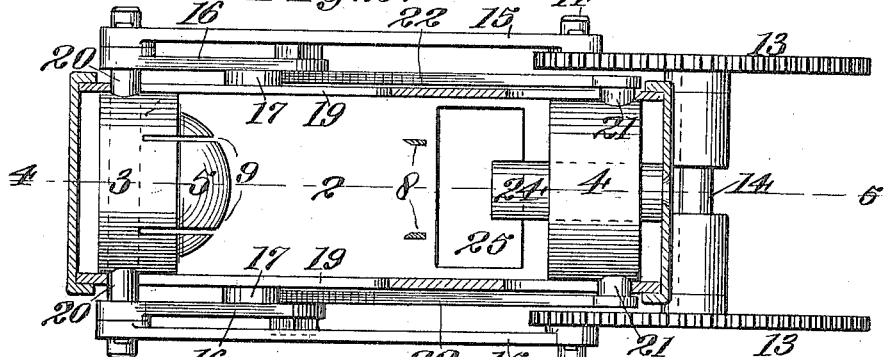
Figure 3:
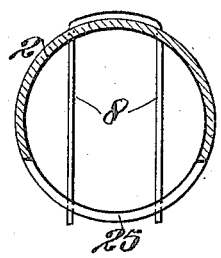

Figure 1 is a side elevation of the machine. Fig. 2 is a transverse, horizontal section on line 2—2 of Fig. 1. Fig. 3 is a vertical, transverse section through the cylinder on line 3—3 of Fig. 1. Fig. 4 is a vertical, longitudinal section on line 4—5 of Fig. 2, with the plungers in elevation and normal position. Fig. 5 is a vertical, longitudinal section on line 4—5 of Fig. 2, with the plungers in section and in operative position. Fig. 6 is a detail end elevation.

As shown in the drawings, A is a base, upon which a cylinder 2 is mounted. Within this cylinder are slidable plungers 3 and 4; one of these plungers having a convex head 5 and the other a concave head 6, and when these plungers are reciprocated these heads are brought together with the fruit between them in such a manner as to thoroughly compress the fruit and extract the juice therefrom.

On the top of the cylinder 2 is a hopper-shaped reservoir 7 into which the fruit may be placed, and through the opening at the bottom one fruit at a time is allowed to enter the cylinder between the plungers when the latter are retracted to their full extent.

8 represents vertically disposed, stationary knives, located in the path of travel of the plungers, and the plunger 5 is slotted, as shown at 9, so that when the fruit is advanced within the cylinder by this plunger it is forced across the cutting edges of the knives 8, which latter enter the slots in the plunger head 5 so as to allow this head to complete its movement and arrive into close proximity with the opposing head 6.

The mechanism for operating these heads is constructed as follows: 10 is a wheel or pulley mounted upon a horizontal shaft 11, which shaft carries pinions 12 which engage gear wheels 13, mounted upon a parallel horizontal shaft 14. These gear wheels are located at the ends of the shaft 14 and are connected by parallel rods 15 with the rocker arms 16 which are pivoted, as shown at 17. The connecting rods 15 have one end mounted upon crank pins $14^a$ which are fitted into the faces of the gears 13, so that, by the rotation of these gears, the cranks are carried around and the rods 15 are reciprocated. This reciprocation is communicated to the ends of the rocker arms 16, thus causing them to oscillate about their pivot shafts 17. These arms 16 are slotted, as shown at 18, so that the pins which connect the rods 15 with the outer ends of the rocker arms are slidable in the slots during their reciprocation.

The cylinder 2 is slotted upon the sides, as shown at 19, and the pins connecting the rods 15 and the rocker arms 16 extend through the sides of the cylinder and connect with opposite sides of the plunger 3, as shown at 20 (Fig. 2), and by this means the plunger 3 is reciprocated a distance equal to twice the distance between the axes of the gear 13 and of the crank pins $14^a$. The other plunger 4 is connected, by pins 21, with one end of the rods 22, the opposite end of which rods are connected with the ends of which rods are connected with the These ends of the rocker arms extend beyond their pivotal points 17, so that as the rocker arms are caused to swing, by their connection with the rods 15 and the crank pins 14ª, they pull the connecting rods 22. These short ends move in a shorter curve, and, by their pull upon the rods 22, act to move the plunger 4 and cause it to approach the plunger 3 but with a shorter movement, caused by the difference in the arcs of the two ends of the rocker arms 16.

24 is a stationary bar extending through the center of the plunger 4 and so located that the plunger is slidable with relation to it. Thus when the plunger 4 is retracted, this bar projects into the space in the cylinder and between the two plungers. When the plungers are caused to approach, the movement of the plunger 4 is sufficient to bring the bottom of its concavity flush with the end of this bar 24, as shown in Fig. 5, and thus closes the bottom of the concavity in the plunger and makes the concavity continuous at that instant; the movement of the plunger 3 being greater, as previously described. When a fruit has been received into the space in front of said plunger the continued movement of the connecting rods and rocker arms will advance this plunger, carrying the fruit with it, while the slower and shorter movement of the plunger 4 advances it to a lesser degree. The longer movement of the plunger 3 forces the fruit against the knives 8, thus severing the fruit into portions which are immediately compressed between this plunger and the opposite plunger 4 until at the instant of greatest compression the bottom of the concavity in plunger 4 is closed by the end of the plug rod 24 and the juice expressed from the fruit is allowed to fall through an opening 25 in the bottom of the cylinder 2. The continued rotation of the cranks then retracts the connecting rods 15, moving the rocker arms 16 and the rods 22 to their former position, thus separating the plungers in readiness to receive another fruit. This separation of the plungers causes the end of the plug 24 to be projected from the plunger 4 and it thus acts as a pusher to insure the discharge of the skins and residue which might otherwise be left in the cavity of the plunger, and this residue falls through the space 25 to a proper receptacle.

Various modifications may be made in the apparatus to produce a differential reciprocating movement of the two plungers, but I have found that here described to be very efficient.

The apparatus is simple, easily kept clean and is very effective for the work for which it is employed.

Having thus described my invention, what I claim and desire to secure by Letters Patent is—

1. In a fruit press, a cylinder, plungers fitting said cylinder, mechanism by which said plungers are reciprocated toward each other with an unequal movement, means for feeding fruit between said plungers, and cutters against which the fruit is pressed and by which it is severed antecedent to the meeting of the plunger heads.

2. A fruit press consisting of a horizontal casing, plungers oppositely reciprocable therein and having heads respectively convex and concave and adapted to fit when they approach, and means by which said opposite reciprocations are effected.

3. A fruit press consisting of a horizontal casing, a feed opening on top near one end, a discharge opening near the opposite end, below, plungers reciprocable toward and from each other, mechanism by which one of said plungers is retracted to expose feed opening to receive a fruit, and advance it to the discharge opening, said mechanism acting to simultaneously advance the opposed plunger to meet the first one in line above the discharge opening, and cutters against which the advancing fruit is divided.

4. A fruit press consisting of a horizontal casing with a top feed opening near one end, and a bottom discharge near the opposite end, plungers reciprocable to and from each other in the casing, rocker arms fulcrumed near one end having the long arms connected with one of said plungers, rods connecting the shorter rocker arms with the opposite plunger, whereby a differential movement of the plungers is effected, and one of them carries the fruit from the feed to the discharge opening, and stationary splitting knives fixed in the path of movement of the fruit.

5. In a fruit press of the character described, a horizontal casing with feed and discharge openings near opposite ends, plungers reciprocable to and from each other, and having respectively convex and concave meeting faces, and stationary knives fixed in the path of movement of the fruit and the convex faced plunger, said plunger having slots in line with the knives to allow the fruit to be split and advanced to be pressed between the plunger faces.

6. In a fruit press of the character described, a casing with feed and discharge openings near opposite ends, plungers reciprocable to and from each other, and knives to which the fruit is fed to, split, and compress the fruit, said plungers having convex and concave faces respectively, and a fixed plug extending through the bottom of the concave face, with its end alternately flush with the bottom and projected therefrom.

7. In a fruit press, a casing, plungers movable to and from each other therein, with registering meeting and compressing faces, a feed opening near one end and a discharge opening near the other end, mechanism by which one of said plungers is reciprocated across the feed opening to receive and advance the fruit toward the discharge, coacting mechanism by which the second plunger is advanced to meet the first one at the discharge opening, splitting knives in the line of travel of the first plunger, and an ejector over which the second plunger moves.

In testimony whereof I have hereunto set my hand in the presence of two subscribing witnesses.

MADELINE M. TURNER.

Witnesses:
H. S. CRAIG,
W. B. RINEHART.

Copies of this patent may be obtained for five cents each, by addressing the "Commissioner of Patents, Washington, D. C."